US008685556B2

(12) United States Patent
Minokawa

(10) Patent No.: US 8,685,556 B2
(45) Date of Patent: Apr. 1, 2014

(54) ELECTRICITY STORAGE MODULE

(75) Inventor: Nobuo Minokawa, Hitachi (JP)

(73) Assignee: Hitachi Vehicle Energy, Ltd., Hitachinaka-shi (JP)

( * ) Notice: Subject to any disclaimer, the term of this patent is extended or adjusted under 35 U.S.C. 154(b) by 105 days.

(21) Appl. No.: 13/399,525

(22) Filed: Feb. 17, 2012

(65) Prior Publication Data

US 2012/0214034 A1 Aug. 23, 2012

(30) Foreign Application Priority Data

Feb. 22, 2011 (JP) .................................. 2011-036010

(51) Int. Cl.
*H01M 2/02* (2006.01)
*H01M 10/50* (2006.01)
*H01M 2/10* (2006.01)

(52) U.S. Cl.
USPC .............. 429/83; 429/82; 429/148; 429/158; 429/120

(58) Field of Classification Search
USPC .......... 429/96–100, 120, 149–160, 163–187, 429/148, 83; 29/623.1–623.5, 730–731, 29/763; 180/68.5, 65.1, 65.21; 221/282; 206/703
See application file for complete search history.

(56) References Cited

U.S. PATENT DOCUMENTS

| 2009/0186266 A1 | 7/2009 | Nishino et al. |
| 2009/0258282 A1 | 10/2009 | Harada et al. |

FOREIGN PATENT DOCUMENTS

| CN | 101552351 A | 10/2009 |
| CN | 101569053 A | 10/2009 |
| JP | 2003-45504 A | 2/2003 |
| JP | 2005-209367 A | 8/2005 |
| JP | 2007-165200 A | 6/2007 |
| JP | 2008-123769 A | 5/2008 |
| JP | 2009-87773 A | 4/2009 |
| JP | 2010-9990 A | 1/2010 |
| JP | 2010-61989 A | 3/2010 |
| JP | 2010-225472 A | 10/2010 |
| JP | 2010-231907 A | 10/2010 |

OTHER PUBLICATIONS

Machine Translation of Natsuume (JP 2010-225472, Published Oct. 2010, pp. 1-22).*
Machine Translation of Okawa (JP 2010-231907, Published Oct. 2010, pp. 1-15).*
Japanese-language Office Action dated Dec. 27, 2012 with English translation (Seven (7) pages).
The Explanation of Circumstances Concerning Accelerated Examination with English Translation submitted to the Japanese Patent Office on Dec. 27, 2012 (previously submitted on Jul. 3, 2013.
Japanese-language Office Action dated Jan. 22, 2013 with English translation (Eight (8) pages).
Chinese Office Action dated Dec. 13, 2013 with English translation of the summary only.

* cited by examiner

*Primary Examiner* — Jonathan Crepeau
*Assistant Examiner* — Caitlin Wilmot
(74) *Attorney, Agent, or Firm* — Crowell & Moring LLP

(57) ABSTRACT

An electricity storage module according to the present invention includes: a battery case that includes a cooling medium intake port, a cooling medium outlet port, and a cooling flow passage through which a plurality of battery cells housed therein in a parallel array pattern are cooled; and a duct detachably mounted at the cooling medium intake port of the battery case.

3 Claims, 10 Drawing Sheets

ELECTRICITY STORAGE MODULE

INCORPORATION BY REFERENCE

The disclosure of the following priority application is herein incorporated by reference: Japanese Patent Application No. 2011-036010 filed Feb. 22, 2011

BACKGROUND OF THE INVENTION

1. Field of the Invention

The present invention relates to an electricity storage module equipped with a cooling means for cooling a plurality of battery cells disposed in an array inside a battery case.

2. Description of Related Art

An electricity storage module known in the related art includes a plurality of battery cells such as a cylindrical lithium-ion secondary batteries housed inside a battery case and connected in series via a bus bar. A power source device for an electric vehicle or a hybrid vehicle is configured with a plurality of such electricity storage modules. Since the battery cells disposed in the battery case at this type of electricity storage module generate heat as they are charged or discharged, a cooling flow passage is formed inside the battery case.

The battery case includes a battery housing portion where batteries, with their axes set parallel to one another are disposed one after another along a direction perpendicular to the axial direction. In the periphery of the battery housing portion, a cooling flow passage, constituted with a cooling space where a cooling medium such as air is allowed to contact the individual battery cells on their outer circumference, is formed. A cooling medium intake-side duct communicating with one end of the battery housing portion and a cooling medium outlet-side duct communicating with another end of the battery housing portion are formed at the battery case.

Japanese Laid Open Patent Publication No. 2003-45504 discloses an electricity storage module with a cooling medium intake-side duct and a cooling medium outlet-side duct formed as integrated parts of the battery case.

SUMMARY OF THE INVENTION

For example, the thermal environment for an electricity storage module is varied according to different installation area in an electric vehicle. For an electricity storage module installed at a location where the ambient temperature is high or where heat cannot be readily dissipated, the flow rate of the cooling medium used to cool the electricity storage module needs to be raised, or the direction along which the cooling medium is distributed needs to be arranged. Similar arrangement will need to be made if the number of battery cells housed in the container changes.

The electricity storage module disclosed in the publication cited above includes a cooling medium intake-side duct formed as an integrated part of the battery case. This means that in order to change the cooling medium intake-side duct, the entire battery case will have to be changed. Such a change of the entire battery case will lead to a greater variety of battery case types, which, in turn, will result in lowered productivity.

According to the 1st aspect of the present invention, an electricity storage module, comprises: a battery case that includes a cooling medium intake port, a cooling medium outlet port, and a cooling flow passage through which a plurality of battery cells housed therein in a parallel array pattern are cooled; and a duct detachably mounted at the cooling medium intake port of the battery case.

According to the 2nd aspect of the present invention, an electricity storage module according to the 1st aspect, it is preferred that the battery case includes an engagement contact portion located inside the battery case; and the duct includes an engaging member that engages with the engagement contact portion of the battery case.

According to the 3rd aspect of the present invention, an electricity storage module according to the 1st aspect, it is preferred that the battery case includes a case body constituted of a metal material with openings formed at two side surfaces thereof facing toward a positive terminal and a negative terminal of each battery cell, and a pair of side plates that block off the openings at the two side surfaces of the case member and hold each battery cell along an outer edge thereof on a side where the positive terminal of the battery cell is present and along an outer edge of the battery cell on a side where the negative terminal of the battery cell is present; and the duct is formed by using a resin material.

According to the 4th aspect of the present invention, an electricity storage module according to the 1st aspect, it is preferred that the duct includes a blade via which a flow of a cooling medium is guided.

According to the 5th aspect of the present invention, an electricity storage module according to the 1st aspect, it is preferred that the duct includes a seal achieving tight contact with an edge at an inner surface of the battery case surrounding the cooling medium intake port.

According to the 6th aspect of the present invention, an electricity storage module according to the 2nd aspect, it is preferred that the duct can be disengaged from the battery case by causing displacement of the duct from outside and thus releasing the engagement contact portion at the battery case from the engaging member of the duct.

DESCRIPTION OF PREFERRED EMBODIMENTS

Figure 1:
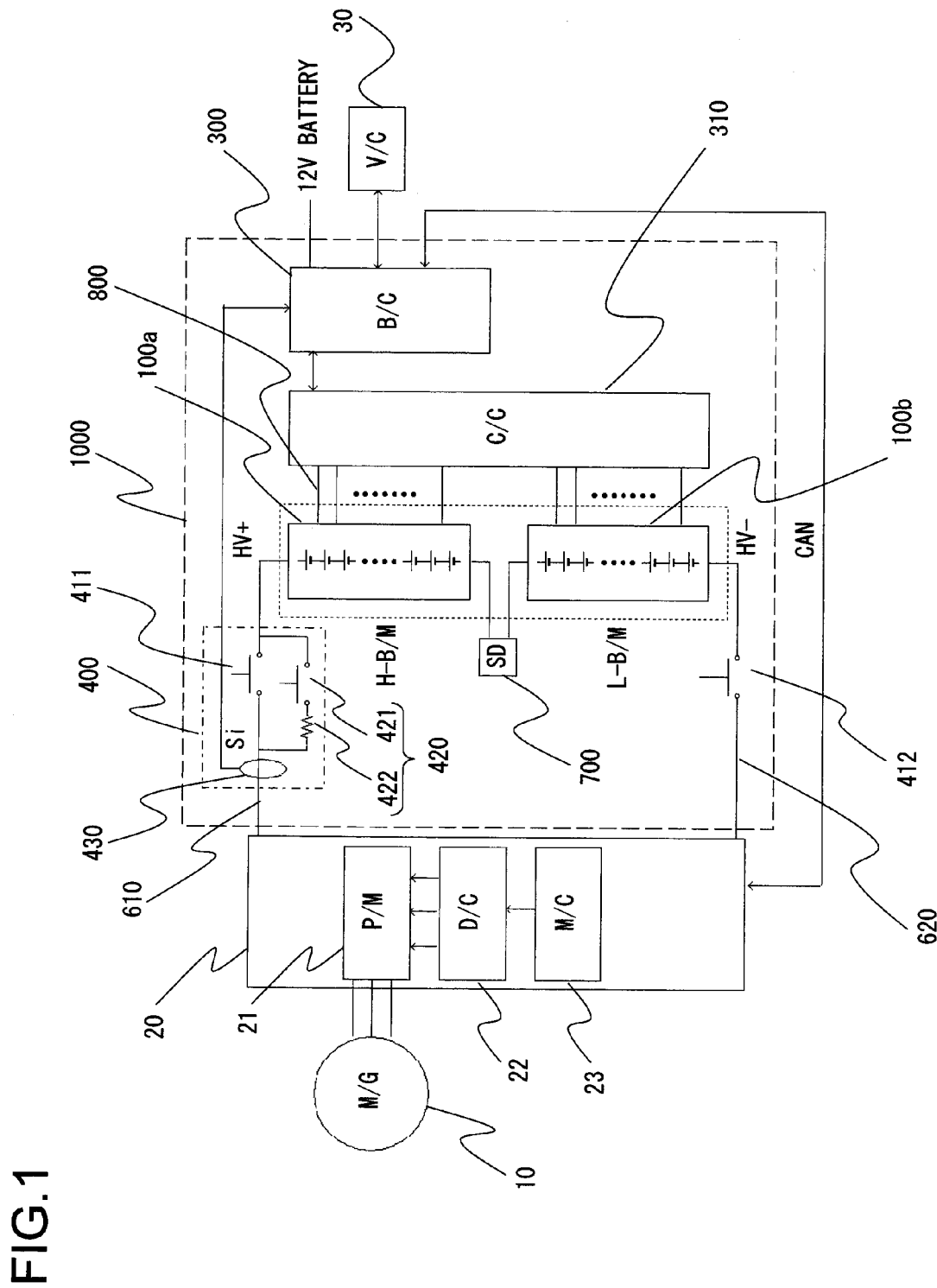
FIG. 1 is a circuit block diagram pertaining to an electricity storage system equipped with electricity storage modules achieved in an embodiment of the present invention.

The following is a detailed description of the electricity storage modules achieved in an embodiment of the present invention, given in reference to drawings.

In the following description, the electricity storage module achieved in the embodiment is included in an electricity storage device constituting part of an in-vehicle power supply system installed in an electrically driven vehicle or, more specifically, in an electric vehicle. The term "electric vehicle" encompasses a hybrid electric vehicle equipped with an internal combustion engine and an electric motor both used as vehicle drive sources and a pure electric vehicle that is exclusively driven with an electric motor.

First, the structure of the electricity storage system (in-vehicle electrical machine system), which includes the electricity storage module achieved in the embodiment is described.

The electricity storage system includes a motor generator 10, an inverter device 20, a vehicle controller 30 that executes overall control for the vehicle, and an electricity storage device 1000 constituting an in-vehicle power supply system. The electricity storage device 1000 may be configured as a lithium-ion battery device that includes a plurality of battery cells.

The motor generator 10 is a three-phase AC synchronous unit. The motor generator 10 is driven as a motor in an operating mode requiring rotational motive power, e.g., when the vehicle is engaged in power running operation or when the internal combustion engine is starting up, so as to provide the rotational motive power generated thereat to drive the driving subjects such as wheels and the engine. In this situation, the in-vehicle electrical machine system converts DC power, provided from the electricity storage device 1000, to three-phase AC power via the inverter device 20 functioning as a power conversion device, and supplies the three-phase AC power resulting from the conversion to the motor generator 10.

When the vehicle is in a operation mode requiring power generation, e.g., when the vehicle is in regenerative operation in which the vehicle is decelerating or being braked, or when the electricity storage device 1000 needs to be charged, the motor generator 10 is driven with a drive force originating from the wheels or the engine so as to generate three-phase AC power. In this mode of operation, the three-phase AC power generated at the motor generator 10 is converted to DC power at the inverter device 20 and the DC power is then supplied to the electricity storage device 1000 in the electrical machine system. Electrical power is thus accumulated at the electricity storage device 1000.

The inverter device 20 is an electronic circuit device that controls the power conversion described earlier, i.e., the conversion from DC power to three-phase AC power and the conversion from three-phase AC power to DC power through operation of the semiconductor switching elements (by switching on/off). The inverter device 20 comprises a power module 21, a driver circuit 22 and a motor controller 23.

The power module 21, which includes six semiconductor switching elements, is a power conversion circuit that executes the power conversion described earlier by switching (on/off) the six semiconductor switching elements.

A DC positive electrode side module terminal and a DC negative electrode side module terminal are electrically connected respectively with a DC positive electrode side external terminal and a DC negative electrode side external terminal. The DC positive electrode side external terminal and the DC negative electrode side external terminal are power source-side terminals via which DC power is exchanged with the electricity storage device 1000, and power cables 610 and 620 extending from the electricity storage device 1000 are electrically connected to the power source-side terminals. An AC-side module terminal is electrically connected with an AC-side external terminal. The AC-side external terminal is a load-side terminal via which three-phase AC power is exchanged with the motor generator 10, and a load cable extending from the motor generator 10 is electrically connected to the load-side terminal.

The motor controller 23 is an electronic circuit device engaged in control of the switching operation of the six semiconductor switching elements constituting the power conversion circuit. The motor controller 23 generates switching operation command signals (e.g., PWM (pulse width modulation) signals) for the six semiconductor switching elements based upon a torque command output from a higher-order controller, e.g., the vehicle controller 30 that controls the entire vehicle. The command signals thus generated are output to the driver circuit 22.

The electricity storage device 1000 includes an electricity storage module unit 100 that accumulates and releases electrical energy (is charged with, and discharges DC power) and a controller 900 (see FIG. 2) that manages and controls the condition of the electricity storage module unit 100.

The electricity storage module unit 100 is constituted with a high potential-side electricity storage module 100a and a low potential-side electricity storage module 100b that are electrically connected in series. The electricity storage modules each include a plurality of lithium ion battery cells (hereafter referred to as battery cells) electrically connected in series. A battery assembly is configured with the plurality of battery cells and connecting members that connect these battery cells in series. The structure of the electricity storage modules 100a and 100b will be described later.

An SD (service disconnect) switch 700 is provided between the negative electrode side (low potential side) of the high potential-side electricity storage module 100a and the positive electrode side (high potential side) of the low potential-side electricity storage module 100b. The SD switch 700 is a safety device installed so as to assure safety when performing maintenance and inspection of the electricity storage device 1000. It is constituted with an electrical circuit with a switch and a fuse electrically connected in series and is operated by a service person when performing maintenance and inspection.

The controller 900 is constituted with a battery controller 300 designated as a higher-order (parent) unit and a cell controller 310 designated as a lower-order (child) unit.

The battery controller 300 manages and controls the condition of the electricity storage device 1000, and also notifies the higher-order controller, such as the vehicle controller 30 or the motor controller 23, of the condition of the electricity storage device 1000 and of charging/discharging control commands indicating, for instance, the allowable charge/discharge power at the electricity storage device 1000. As management and control of the electricity storage device 1000, there may be referred measurement of voltage and the current at the electricity storage device 1000, determining through calculation of the state of charge (SOC) and the state of health (SOH) at the electricity storage device 1000, measurement of temperature of the individual electricity storage modules and output of commands for the cell controller 310 (e.g., a command for measuring voltage of each battery cell and a command for adjusting accumulated charge in each battery cell).

The cell controller 310, constituted with a plurality of integrated circuits (ICs), functions as the subordinates of the battery controller 300 as it manages and controls the conditions of the lithium ion battery cells in response to commands provided from the battery controller 300. The conditions in the battery cells are managed and controlled by measuring the voltages at the individual battery cells, adjusting the quantity of power stored in the individual battery cells and the like.

Namely, although not shown, the cell controller 310 includes a voltage sensor for voltage measurement at each battery cell. A plurality of battery cells is assigned to each integrated circuit, which controls and manages the conditions of the corresponding battery cells.

The battery cells are used as the power source for the corresponding integrated circuit in the cell controller 310. For this reason, the cell controller 310 and the electricity storage module unit 100 are electrically connected via connecting lines 800. The voltage corresponding to the maximum potential among the potentials at the corresponding battery cells is applied to the corresponding integrated circuit via the connecting line 800.

A positive terminal of the high potential-side electricity storage module 100a and the DC positive electrode side external terminal of the inverter device 20 are electrically connected via the positive electrode side power cable 610. A negative terminal of the low potential-side electricity storage module 100b and the DC negative electrode side external terminal of the inverter device 20 are electrically connected via the negative electrode side power cable 620.

A junction box 400 and a negative electrode side main relay 412 are disposed respectively on the power cable 610 and on the power cable 620. Inside the junction box 400, a relay structure constituted with a positive electrode side main relay 411 and a pre-charge circuit 420 is housed. The relay structure is a switching unit that electrically connects or disconnects the electricity storage module unit 100 and the inverter device 20. When starting up the in-vehicle electrical machine system, the electricity storage module unit 100 and the inverter device 20 are electrically connected, whereas when the in-vehicle electrical machine system is turned off or in the event of an error, the electricity storage module unit 100 and the inverter device 20 are electrically disconnected. By controlling the electrical connection between the electricity storage device 1000 and the inverter device 20 via the relay structure as described above, a high level of safety is assured for the in-vehicle electrical machine system.

Drive of the relay structure is controlled by the motor controller 23. Upon receiving a startup complete notice indicating that the electricity storage device 1000 has been fully started up from the battery controller 300 as the in-vehicle electrical machine system is started up, the motor controller 23 outputs a connection command signal to the relay structure, thereby driving the relay structure. In addition, when the in-vehicle electrical machine system is turned off or when a fault has occurred in the in-vehicle electrical machine system, the motor controller 23 outputs a disconnection command signal to the relay structure based upon an OFF signal output from the ignition key switch or a fault signal received from the vehicle controller so as to drive the relay structure.

A main relay is constituted with the positive electrode side main relay 411 and the negative electrode side main relay 412. The positive electrode side main relay 411, disposed on the positive electrode side power cable 610, controls the electrical connection between the positive electrode side of the electricity storage device 1000 and the positive electrode side of the inverter device 20. The negative electrode side main relay 412, disposed on the negative electrode side power cable 620, controls the electrical connection between the negative electrode side of the electricity storage device 1000 and the negative electrode side of the inverter device 20.

The pre-charge circuit 420 is a serial circuit formed by electrically connecting a pre-charge relay 421 and a resistor 422 in series, and is electrically connected in parallel to the positive electrode side main relay 411.

The in-vehicle electrical machine system is started up by first turning on the negative electrode side main relay 412 and then turning on the pre-charge relay 421. As a result, the electric current supplied from the electricity storage device 1000 is first limited via the resistor 422 and the current thus limited is then supplied to a smoothing capacitor at the inverter to charge the smoothing capacitor. After the smoothing capacitor is charged to achieve a predetermined voltage, the positive electrode side main relay 411 is turned on and the pre-charge relay 421 is opened. Thus, the main current is supplied from the electricity storage device 1000 to the inverter device 20 via the positive electrode side main relay 411.

In addition, a current sensor 430 is housed inside the junction box 400. The current sensor 430 is installed for detection of the current supplied from the electricity storage device 1000 to the inverter device 20. The output line of the current sensor 430 is electrically connected to the battery controller 300. Based upon a signal output from the current sensor 430, the battery controller 300 is able to detect the current supplied from the electricity storage device 1000 to the inverter device 20. Current detection information indicating the detected current is notified from the battery controller 300 to the motor controller 23, the vehicle controller 30 and the like.

In an alternative configuration, the current sensor 430 may be installed outside the junction box 400. The current originating from the electricity storage device 1000 may be detected on the side of the positive electrode side main relay 411 further toward the electricity storage module 100a, instead of on the side of the positive electrode side main relay 411 further toward the inverter device 20.

The voltage sensor that detects the voltage at the electricity storage device 1000 installed in the cell controller 310 in the description provided above may instead be housed inside the junction box 400. The output line of such a voltage sensor housed inside the junction box 400 should be electrically connected to the battery controller 300, as is the output line of the current sensor 430. Based upon a signal output from the voltage sensor, the battery controller 300 is able to detect the voltage at the electricity storage device 1000 as a whole. Voltage detection information indicating the detected voltage is provided to the motor controller 23 and the vehicle controller 30. The voltage at the electricity storage device 1000 may be detected either on the side of the relay structure further toward the electricity storage module unit 100 or on the side of the relay structure further toward the inverter device 20.

Figure 2:
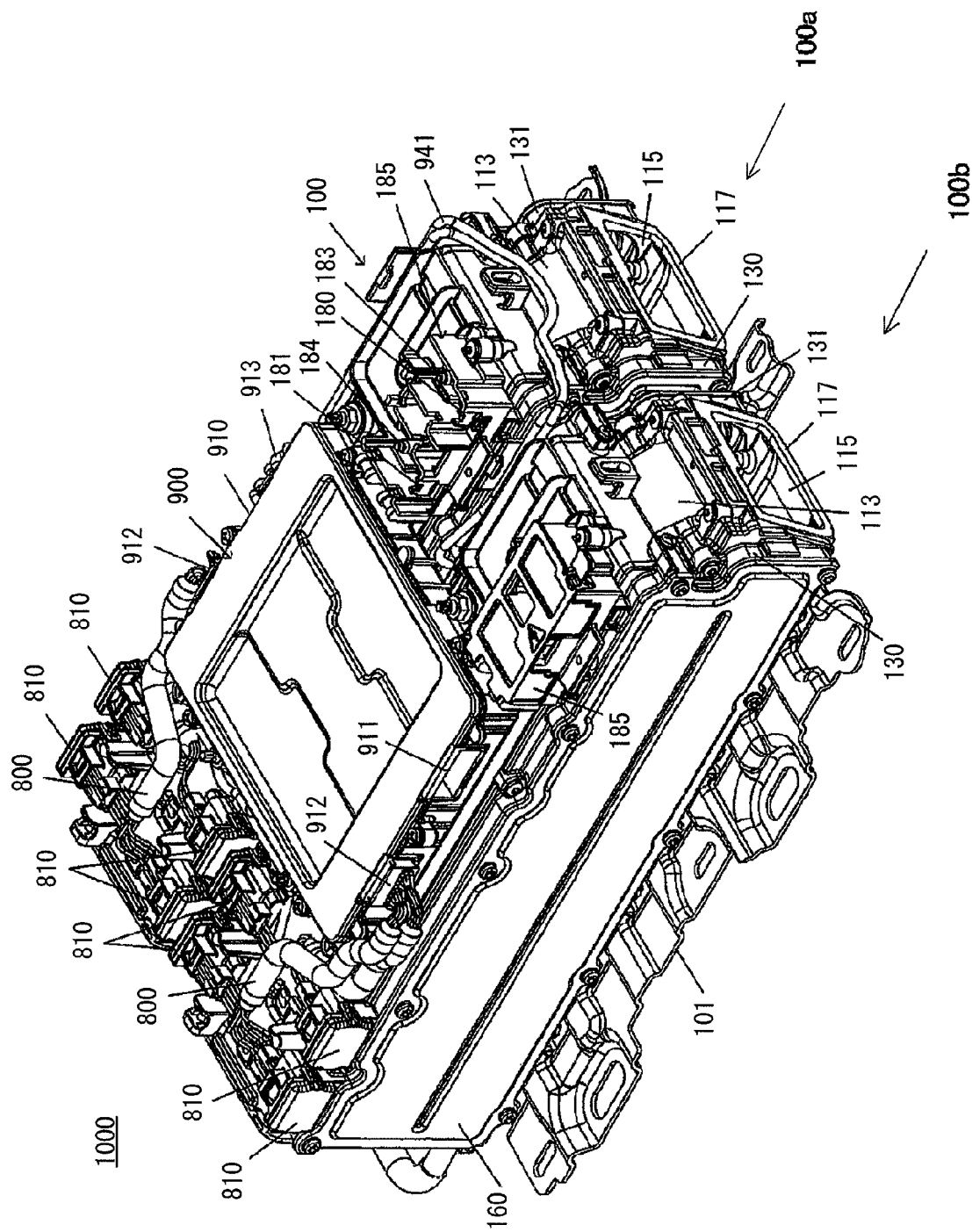
FIG. 2 is an external perspective view of the entire electricity storage system achieved in the embodiment of the present invention.
Figure 3:
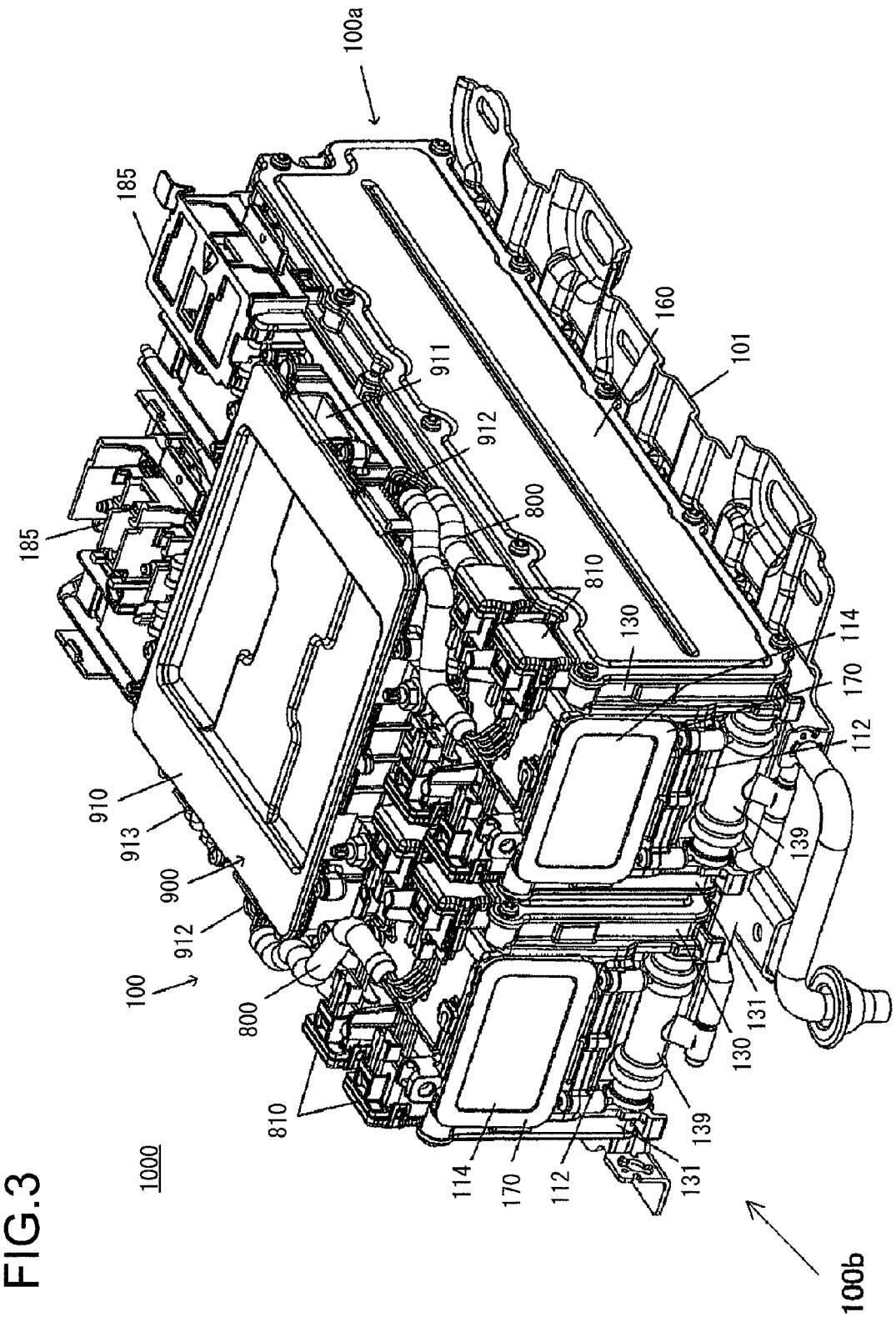
FIG. 3 is a perspective view of the electricity storage system in FIG. 2, viewed from the cooling medium intake side.

FIGS. 2 and 3 each show the overall structure of the electricity storage device 1000 in a perspective view. FIG. 2 shows the electricity storage device 1000 viewed from the cooling medium outlet side, whereas FIG. 3 shows the electricity storage device 1000 viewed from the cooling medium intake side. The electricity storage device 1000 is configured with two units, i.e., the electricity storage module 100 and the controller 900. The structure of the electricity storage module 100 is first described.

As explained earlier, the electricity storage module 100 is constituted with the high potential-side electricity storage module 100a and the low potential-side electricity storage module 100b. The electricity storage modules 100a and 100b each include a plurality of battery cells electrically connected in series. As shown in FIG. 2, the high potential-side electricity storage module 100a and the low potential-side electricity storage module 100b are set next to each other so that the longer sides of the two blocks are parallel.

The high potential-side electricity storage module 100a and the low potential-side electricity storage module 100b, set side-by-side upon a module base 101, are locked to the module base 101 by a locking means such as bolts. The module base 101, divided into three parts along its shorter sides and constituted with a rigid thin metal plate (e.g., an iron plate), is fixed to the vehicle. Namely, the module base 101 is constituted with three members, arranged at both ends and at center along the shorter side. This structure allows the surface of the module base 101 to lie in a same level with the lower surfaces of the two electricity storage modules 100a and 100b and thus allows the electricity storage module unit 100 to achieve a smaller dimension in the height direction.

The top sides of the high potential-side electricity storage module 100a and the low potential-side electricity storage module 100b are fixed to a casing 910 of the controller 900 to be described later.

It is to be noted that the high potential-side electricity storage module 100a and the low potential-side electricity storage module 100b adopt structures which are basically identical to each other. Accordingly, the following description of an electricity storage module 100, representing both electricity storage modules, is pertinent to the high potential-side 100a and the low potential-side electricity storage module 100b.

Figure 4:
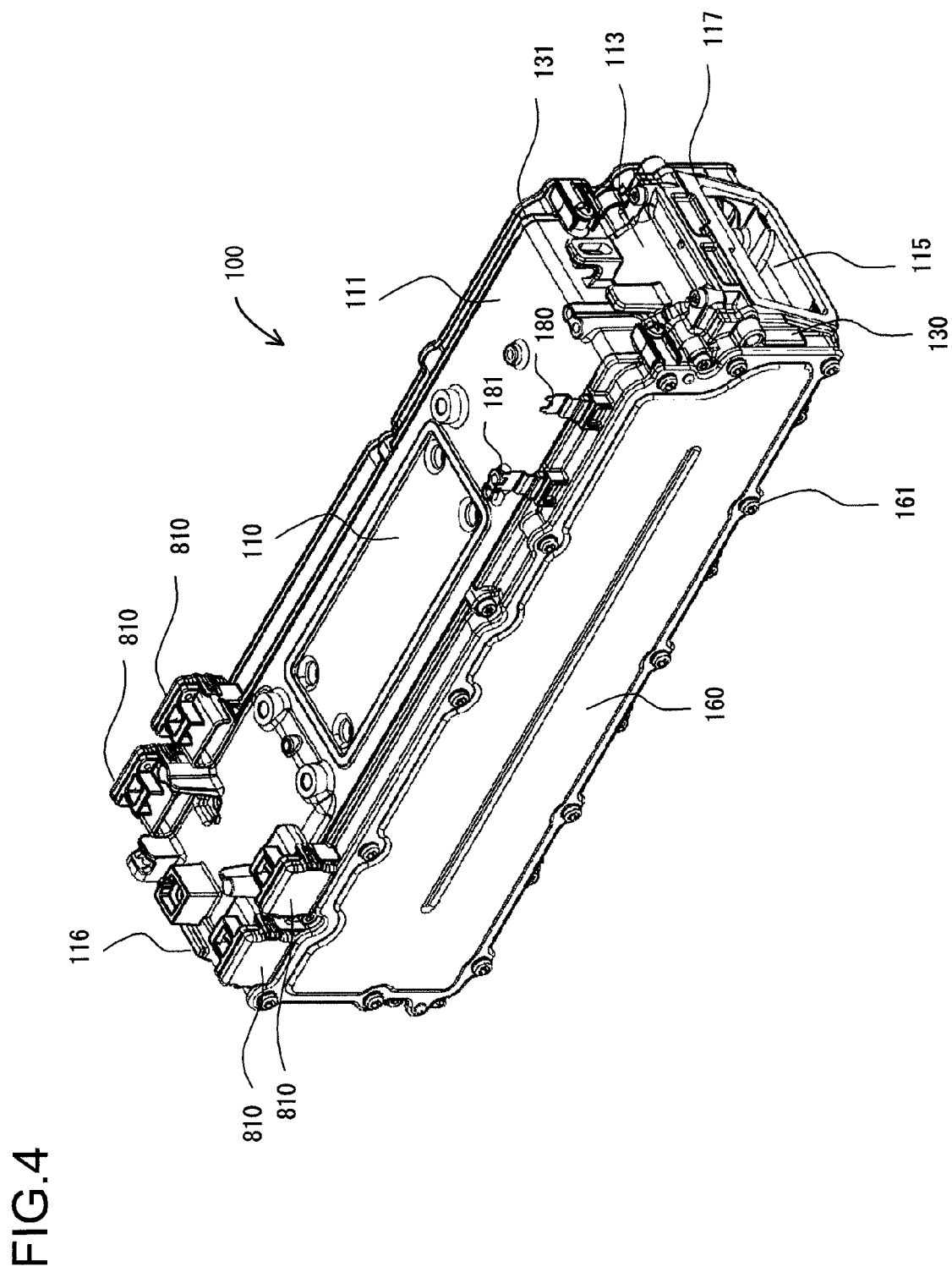
FIG. 4 is an external perspective view of an electricity storage module achieved in the embodiment of the present invention, viewed from the cooling medium outlet side.
Figure 5:
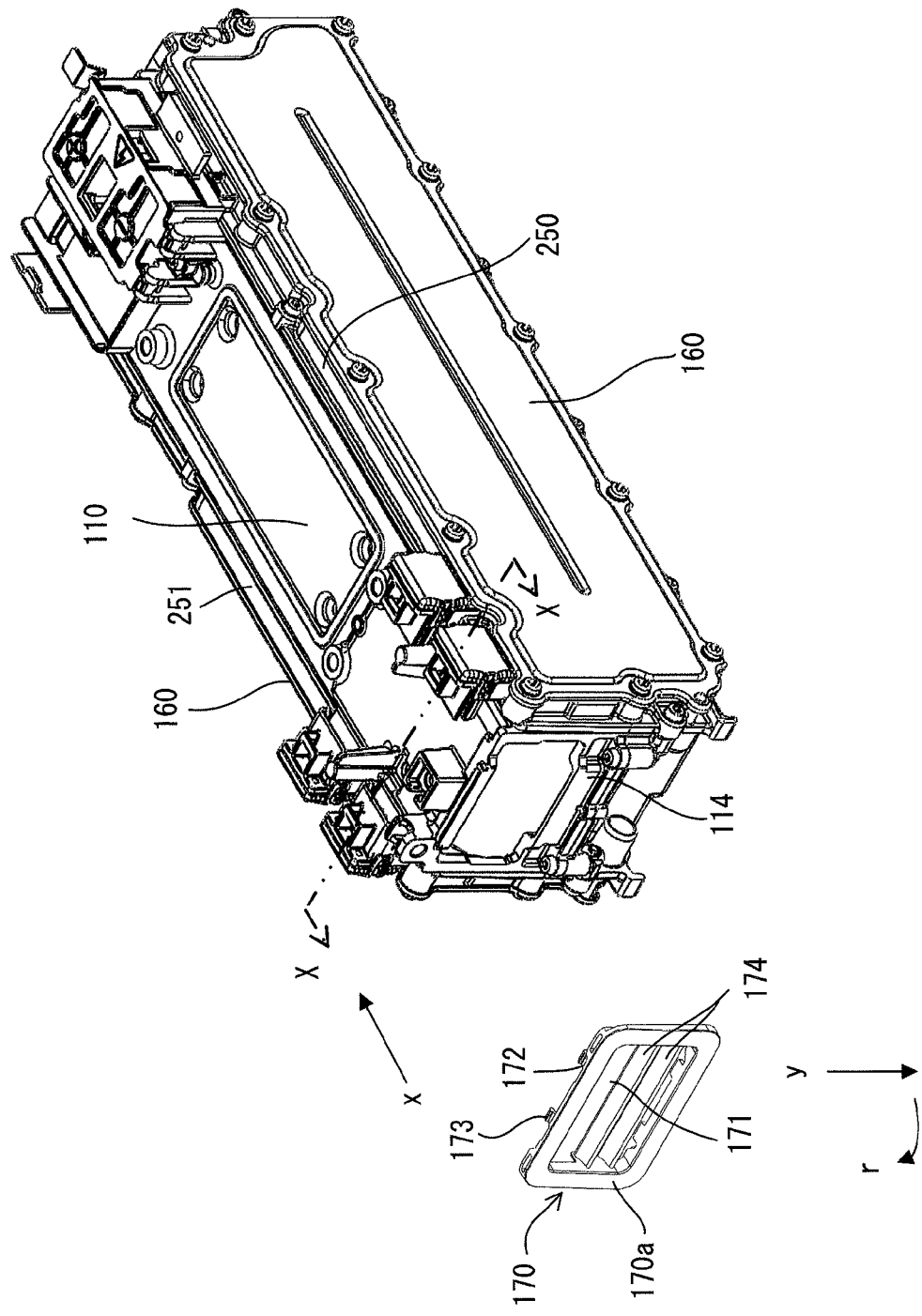
FIG. 5 is an external perspective view of an electricity storage module achieved in the embodiment of the present invention, viewed from the cooling medium intake side.

FIGS. 4 and 5 each show the electricity storage module unit 100 constituting part of the electricity storage device 1000 in a perspective view. FIG. 4 shows the electricity storage module unit 100 viewed from the cooling medium outlet side, whereas FIG. 5 shows the electricity storage module unit 100 viewed from the cooling medium intake side. In addition, FIG. 6 provides a exploded perspective view of the electricity storage module unit 100.

Figure 6:
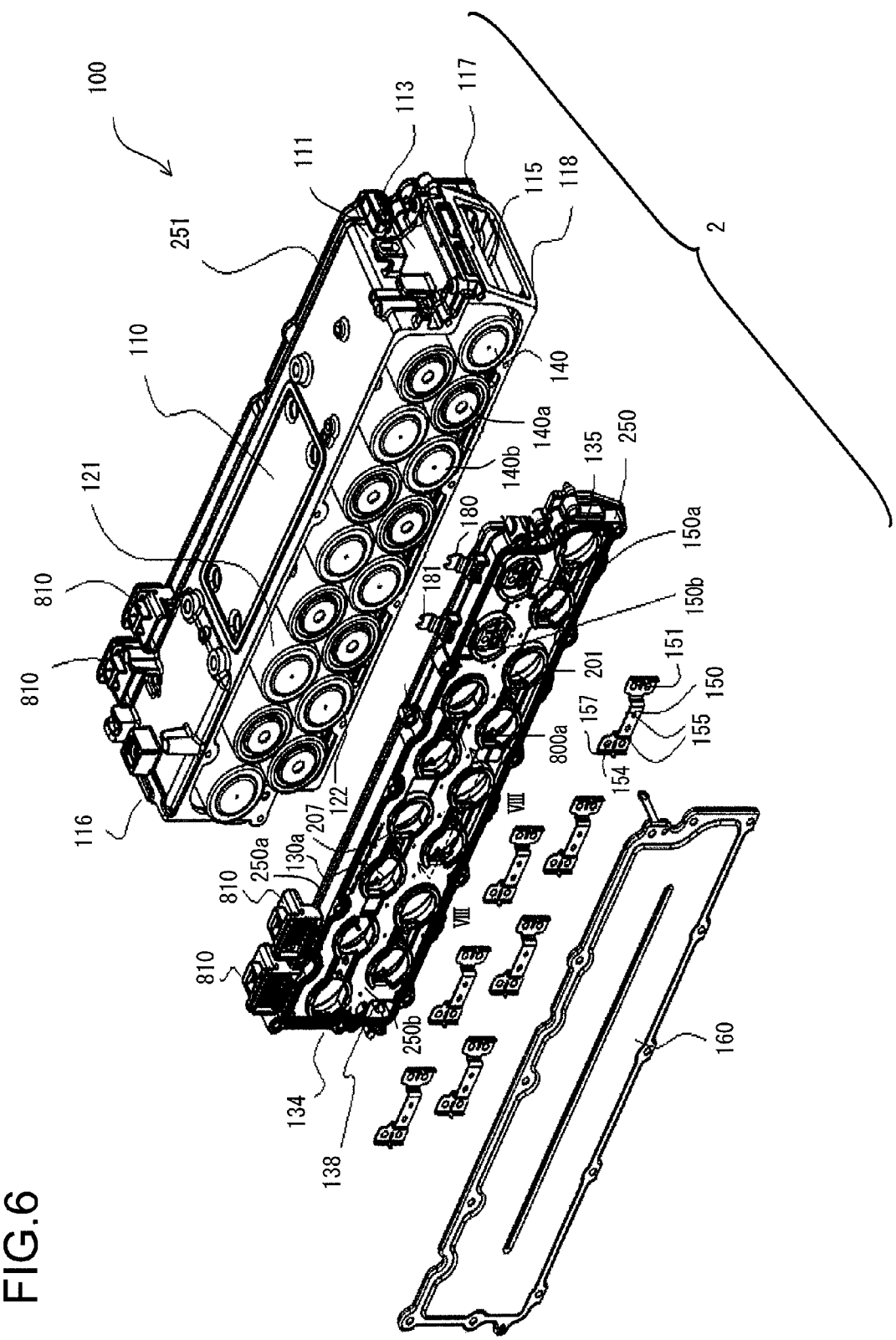
FIG. 6 is an exploded perspective view of the electricity storage module shown in FIG. 4.

As shown in FIG. 6, the electricity storage module unit 100 includes a battery case 2 constituted with a case body 110, a pair of side plates 250 and 251 disposed along the two sides of the case body 110 and a pair of covering plates 160 each disposed further outside relative to one of the side plates (see FIG. 6). Inside the battery case 2, 16 battery cells 140 are housed. The 16 battery cells 140 are electrically connected in series via a plurality of conductive members that will be described in detail later.

The case body 110 constitutes a substantially hexahedral block casing with openings formed at the two sides thereof. More specifically, it includes an intake flow passage forming portion 111, an outlet flow passage forming portion 118, an intake-side guide portion 112 (see FIG. 3) and an outlet-side guide portion 113 (see FIG. 4). The internal space at the case body 110 forms a housing chamber where the battery cells 140 are housed and also functions as a cooling passage, through which the cooling medium (cooling air) used to cool the battery cells 140 flows.

It is to be noted that the term "lengthwise direction" used in the following description is defined as the direction along which the case body 110 ranges over the greatest length or the direction along which the case body 110 ranges from the intake-side guide portion 112 toward the outlet-side guide portion 113.

In addition, the term "crosswise direction" is defined as the direction along which the two side plates 250 and 251 face opposite each other. The central axis of a battery cell 140 (extending along the direction in which the two electrodes at the positive terminal and the negative terminal of a given battery cell face opposite each other, is laid along the crosswise direction.

In addition, the term "heightwise direction" is defined as the direction along which the intake flow passage forming portion 111 and the outlet flow passage forming portion 118 face opposite each other, irrespective of the orientation in which the electricity storage module unit 100 is installed.

The intake flow passage forming portion 111 is a rectangular flat plate forming the upper surface of the case body 110. The outlet flow passage forming portion 118 (see FIG. 6) is a flat plate forming the bottom surface of the case body 110. While the full lengths of the intake flow passage forming portion 111 and the outlet flow passage forming portion 118 are substantially equal to each other, their ends assume positions offset relative to each other along the lengthwise direction.

The intake-side guide portion 112 (see FIG. 3) is a plate member forming one of the side surfaces of the case body 110 facing opposite each other along the lengthwise direction. The outlet-side guide portion 113 is a plate member forming the other side surface facing opposite the first side surface along the lengthwise direction at the case body 110.

The intake flow passage forming portion 111, the outlet flow passage forming portion 118, the intake-side guide portion 112 and the outlet-side guide portion 113 are formed as an integrated unit constituting the case body 110 through, for instance, aluminum die casting.

A cooling medium intake port 114 (see FIG. 5), through which the cooling air used as the cooling medium is taken into the case body 110, is formed between the intake flow passage forming portion 111 and the intake-side guide portion 112. A cooling medium intake duct 170, through which the cooling air is guided to the cooling medium intake port 114, is disposed at the cooling medium intake port 114 (see FIGS. 3 and 5). The mounting structure adopted in conjunction with the cooling medium intake duct 170 and the case body 110 will be described later.

As described earlier, the ends of the intake flow passage forming portion 111 facing opposite each other along the lengthwise direction are offset along the lengthwise direction relative to the ends of the outlet flow passage forming portion 118 facing opposite each other along the lengthwise direction. The extent of offset of the ends facing opposite each other along the lengthwise direction is slightly smaller than the diameter of each battery cell 140, and a step corresponding to the extent of this offset is formed at the end of the case body 110 on the intake side. As a result, a space is formed between the cooling medium intake port 114 and the intake-side guide portion 112 along the lengthwise direction. A gas discharge pipe 139 (see FIG. 3) is housed in this space.

This structure allows the electricity storage module unit 100 to assume a smaller dimension along the lengthwise direction.

A cooling medium outlet port 115, through which cooling air flows out of the case body 110, is formed between the outlet flow passage forming portion 118 and the outlet-side guide portion 113. A cooling medium outlet duct 117, through which the cooling air is guided from the cooling medium outlet port 115 to the outside, is disposed at the cooling medium outlet port 115.

The positions assumed for the cooling medium intake port 114 and the cooling medium outlet port 115 along the heightwise direction (along the direction in which the intake flow passage forming portion 111 and the outlet flow passage forming portion 118 face opposite each other) are offset relative to each other. Namely, while the cooling medium intake port 114 is positioned further toward the intake flow passage forming portion 111 along the heightwise direction, the cooling medium outlet port 115 is positioned further toward the outlet flow passage forming portion 118 along the heightwise direction.

The intake flow passage forming portion 111, the cooling medium intake port 114, the cooling medium outlet port 115 and the cooling medium outlet duct 117 are formed as integrated parts of the case body 110 in the embodiment. However, as FIG. 5 shows, the cooling medium intake duct 170 is formed as a member separate from the case body 110 and is mounted at the cooling medium intake port 114 of the case body 110.

The side plates 250 and 251 are disposed so as to face opposite each other along the crosswise direction of the case body 110. The side plates 250 and 251 are members each molded to substantially achieve the shape of a flat plate and are constituted of a synthetic resin such as PBT (polybutylene terephthalate) or PP (polypropylene) assuring electrical insulation.

Further outward relative to the side plates 250 and 251, i.e., on the sides further away from the housing chamber where the battery cells 140 are housed, the covering plates 160, often referred to as side covers, are disposed. One of the covering plates 160 is locked onto the side plate 250 via fastening members 161 such as bolts or rivets.

The covering plate 160 is a flat plate formed by press machining a metal plate constituted of iron, aluminum or the like, or by molding a resin such as PBT. The covering plate 160 is formed so as to achieve a shape substantially identical to the flat shape of the side plate 250. An area of the covering plate 160, which includes positions corresponding to those of through holes 201 formed at the side plate 250 as described later, is uniformly bulging toward the side away from the side plate 250, i.e., toward the outside of the case body 110. As a result, a space is formed between the covering plate 160 and the side plate 250. This space functions as a gas release chamber where gas including liquid in mist form, emitted from the battery cells 140, is released separately from the cooling medium flowing through the cooling passage.

The battery cells 140 are housed in a neat array within the housing chamber formed inside the case body 110. They are held between the side plates 250 and 251 facing opposite each other along the crosswise direction and are electrically connected in series via a bus bar constituted with a plurality of conductive members 150 that are bonded to the battery cells 140.

A cylindrical lithium-ion secondary battery with a positive terminal 140*a* formed at one end thereof and a negative terminal 140*b* formed at another end thereof may constitute each battery cell 140, which includes components such as a power generating unit and a safety valve housed inside a battery cell case filled with a non-aqueous electrolyte. The safety valve located on the side where the positive terminal 140*a* is present, is a cleavage valve that cleaves when the pressure inside the battery cell case reaches a predetermined level due to an abnormality such as an overcharge. The safety valve functions as a fuse mechanism that cuts the electrical connection between the battery lid and the positive side of the battery element as it cleaves, and also functions as a pressure reducing mechanism that discharges a gas generated inside the battery cell case, i.e., carbon dioxide gas containing the electrolyte in mist form, to the outside of the battery cell case.

In addition, a cleaving groove is formed on the side of the battery cell case where the negative electrode 140*b* is present so as to cause a cleavage when the internal pressure at the battery cell case reaches a predetermined level due to an abnormality such as an overcharge. Thus, the gas generated inside the battery cell case can be released through the negative terminal side as well. The nominal output voltage of the battery cells 140 is 3.0 to 4.2 V, whereas the nominal mean output voltage is 3.6 V.

In the embodiment, sixteen cylindrical battery cells 140 are disposed in a neat array inside the case body 110. More specifically, a first battery cell row 121, taking an upper position, is formed with eight battery cells 140 laid flat by allowing their central axes to extend along the crosswise direction and set side-by-side parallel to one another. In addition, a second battery cell row 122, taking a lower position, is formed with eight battery cells 140 set side-by-side parallel to one another, as are the eight battery cells 140 in the first battery cell row 121. In other words, inside the case body 110, the battery cells 140 are disposed over eight columns set one after another along the lengthwise direction and over two stages set one on top of the other along the heightwise direction.

The first battery cell row 121 and the second battery cell row 122 are offset relative to each other along the lengthwise direction. Namely, the first battery cell row 121, assuming a position closer to the intake flow passage forming portion 111 than the second battery cell row 122, is offset toward the cooling medium intake port 114. The second battery cell row 122, assuming a position closer to the outlet flow passage forming portion than the first battery cell row 121, is offset toward the cooling medium outlet port 115.

As shown in FIG. 6, the first battery cell row 121 and the second battery cell row 122 are offset relative to each other along the lengthwise direction so that the position assumed along the lengthwise direction by the central axis of the battery cell 140 in the first battery cell row 121 taking up the position closest to the cooling medium outlet port 115 is set at the middle point between the central axis of the battery cell 140 in the second battery cell row 122 taking up the position closest to the cooling medium outlet port 115 and the central axis of the next battery cell 140 in the second battery cell row 122.

The battery cells 140 in the first battery cell row 121 are set side-by-side so that the terminals 140*a* and 140*b* of a battery cell 140 alternate for each battery cell and with their central axes parallel to one another. Likewise, the battery cells 140 in the second battery cell row 122 are set side-by-side so that the terminals 140*a* and 140*b* of a battery cell 140 alternate for each battery with their central axis centers parallel to one another. It is to be noted that the arrangement of ordering of the terminals at the battery cells 140 in the first battery cell row 121, starting on the side where the cooling medium intake port 114 is present and advancing toward the cooling medium outlet port 115, is different from the arrangement of ordering of the terminals at the battery cells 140 in the second battery cell row 122, starting on the side where the cooling medium intake port 114 is present and advancing toward the cooling medium outlet port 115.

Namely, the battery cells 140 in the first battery cell row 121 are disposed so that a negative terminal 140*b*, a positive terminal 140*a*, a negative terminal 140*b*, . . . , and a positive terminal 140*a* are set in this order to face toward the side plate 250, starting from the side where the cooling medium intake port 114 is present toward the side where the cooling medium outlet port 115 is present. The battery cells 140 in the second battery cell row 122, on the other hand, are disposed so that a positive terminal 140*a*, a negative terminal 140*b*, a positive terminal 140*a*, . . . , and a negative terminal 140*b* are set in this order to face toward the side plate 250, starting from the side where the cooling medium intake port 114 is present toward the side where the cooling medium outlet port 115 is present.

By disposing the first battery cell row 121 and the second battery cell row 122 with an offset relative to each other along the lengthwise direction as described above, the dimension of the case body 110, measured along the height wise direction, can be reduced, which, in turn, will contribute to size reduction of the electricity storage module unit 100 along the heightwise direction.

Next, the structure of the pair of side plates 250 and 251, which hold the first battery cell row 121 and the second battery cell row 122 on the two sides, is described. While the following description focuses on the structure of one of the side plates, i.e., the side plate 250, the structure of the other side plate 251 is essentially the same as that of the side plate 250.

For explaining the structure of the side plates 250 and 251, returning to FIG. 1, the electricity storage module unit 100 will be described dividing it to a high potential-side electricity storage module 100a and a low potential-side electricity storage module 100b shown.

A terminal of the positive electrode side power cable 610 is electrically connected to a positive electrode side input/output terminal 183 (see FIG. 2) of the high potential-side electricity storage module 100a, and a terminal of a cable that is electrically connected to one end of the SD switch 700 is connected to a negative electrode side input/output terminal 184 (see FIG. 2) of the high potential-side electricity storage module 100a. A terminal of the cable that is electrically connected to another end of the SD switch 700 is connected to the positive electrode side input/output terminal 183 of the low potential-side electricity storage module 100b. A terminal of the negative electrode side power cable 620 is connected to the negative electrode side input/output terminal 184 of the low potential-side electricity storage module 100b. It is to be noted that in FIG. 2 a subassembly 185 of the high potential-side electricity storage module 100a is in a state that it is covered with a terminal cover, and the subassembly 185 in the low potential-side electricity storage module 100b is in a state that a terminal cover is removed.

Figure 7:
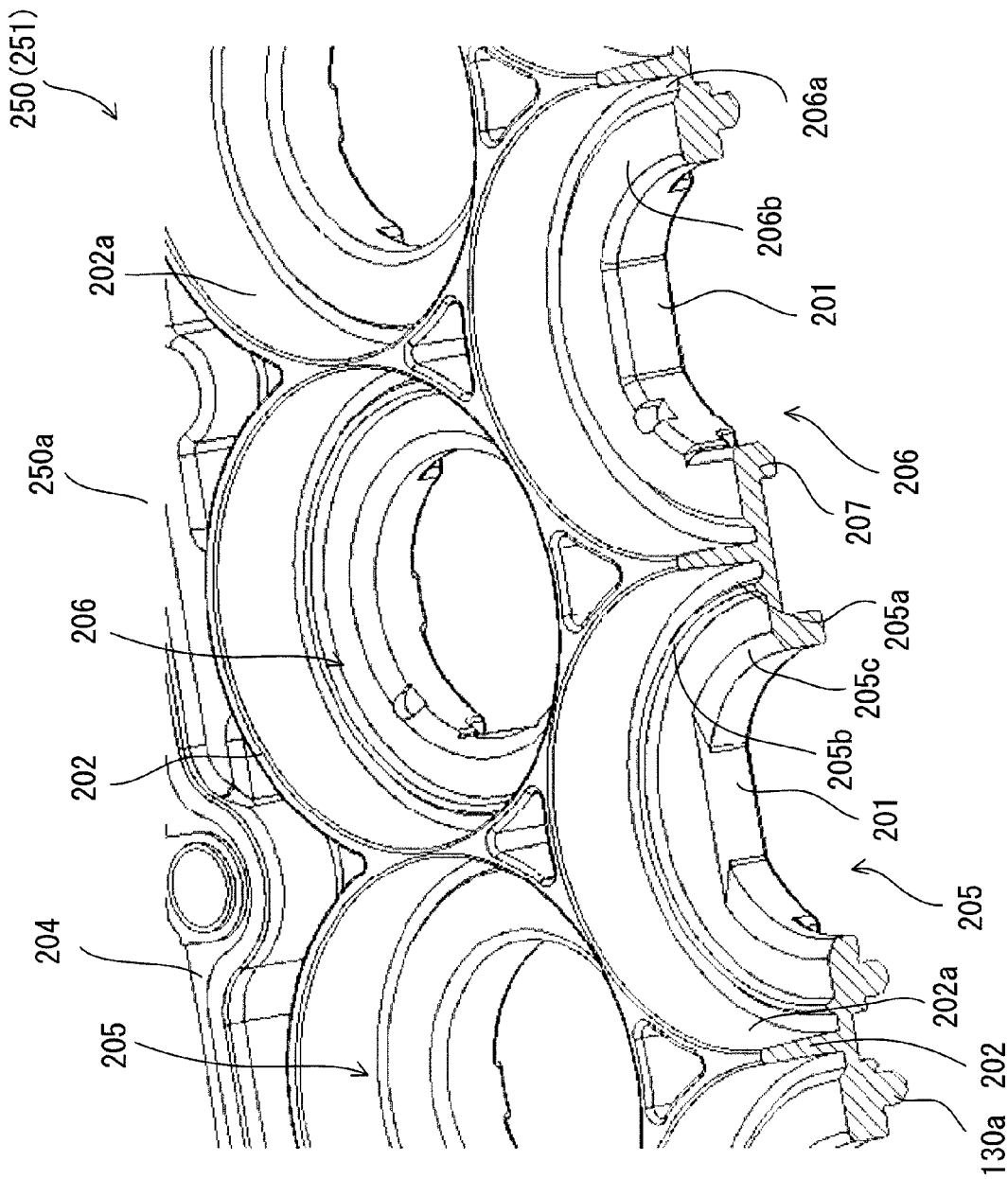
FIG. 7 is an enlarged perspective view of a side plate constituting the battery case in FIG. 6.
Figure 8:
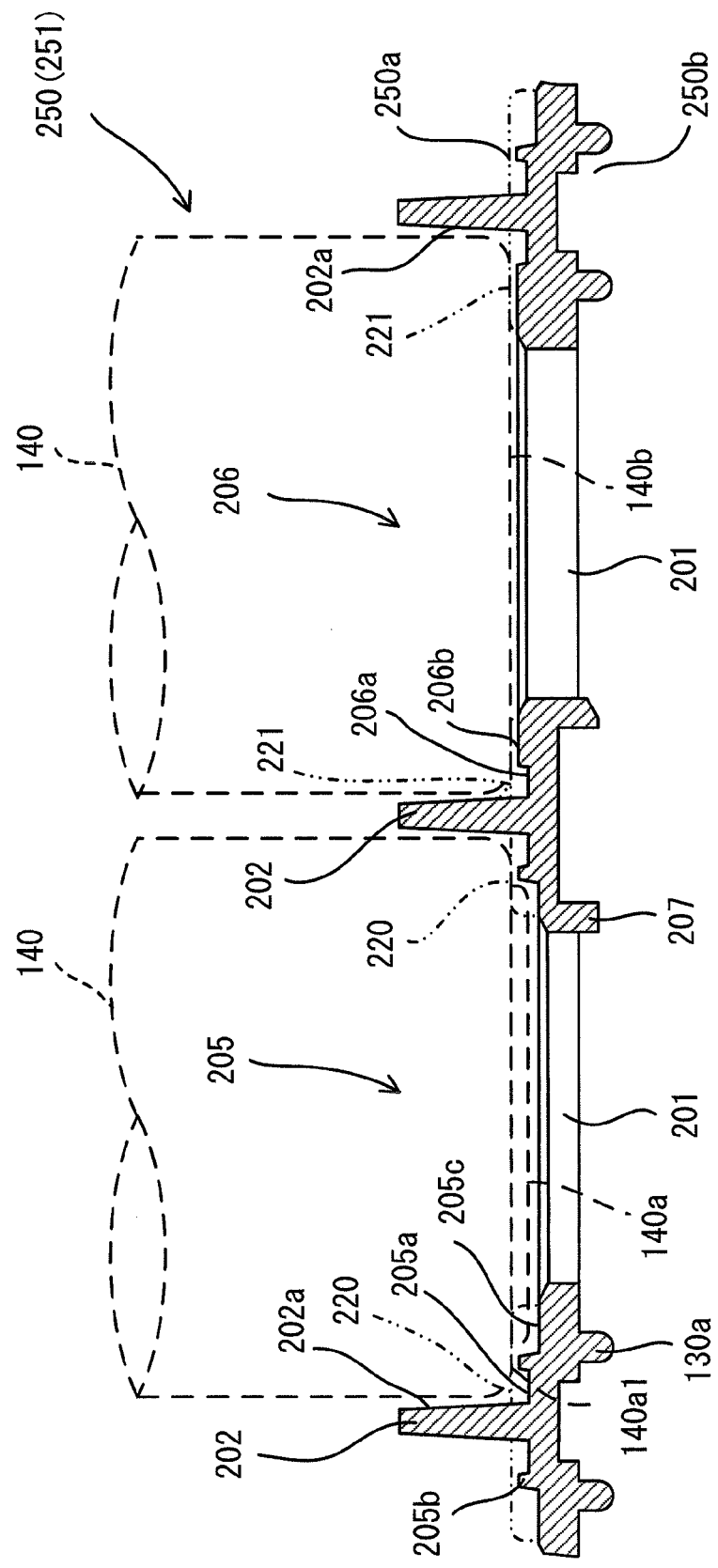
FIG. 8 is a sectional view taken through line VIII-VIII in FIG. 6.

FIG. 7 shows a side plate constituting the battery case 2 in FIG. 6 in an enlarged perspective view, whereas FIG. 8 is a sectional view taken through line VIII-VIII in FIG. 6.

The side plate 250 is formed as a substantially rectangular flat plate, as shown in FIGS. 5 and 6. Sixteen round through holes 201 passing through the side plate 250 along the crosswise direction are formed at the side plate 250. The sixteen through holes 201 are formed with an offset along the lengthwise direction so that the central axes of the battery cells 140 in one battery cell row, i.e., either the first battery cell row 121 taking the upper position or the second battery cell row 122 taking the lower position, are set between the battery cells 140 in the other battery cell row.

As the sixteen battery cells 140 are housed in the case body 110, the sixteen through holes 201 at the side plate 250 each become blocked by the positive terminal 140a or the negative terminal 140b of a battery cell 140. Likewise, the sixteen through holes 201 at the side plate 251, too, each become occupied with the positive terminal 140a or the negative terminal 140b of a battery cell 140. It is to be noted that the arrangement of positive/negative terminals of the battery cells 140 with which the through holes 201 at the side plate 250 are occupied and the arrangement of positive/negative terminals of the battery cells 140 with which the corresponding through holes 201 at the side plate 251 are occupied are reversed from each other.

The side plate 250 includes an side portion 204 with a predetermined thickness, located at the periphery thereof. The sixteen through holes 201 where the battery cells 140 are to be installed, are formed further inside relative to the side portion 204. The through holes 201 are each surrounded by a ring-shaped wall portion 202, with an opening 202a, which is slightly larger than the outer diameter of the battery cells 140, formed thereat. The wall portion 202 is used as a guide member when installing a battery cell 140 at the corresponding through hole 201 and also used as a holding member that holds the battery cell 140 in place. In other words, the battery cells 140 are each installed by inserting the peripheral area near the positive terminal 140a or the negative terminal 140b thereof with the ring-shaped wall portion 202 functioning as a guide member. Once each battery cell is inserted, it is held in place by the ring-shaped wall portion 202.

The through holes 201 on the upper side and the through holes 201 on the lower side take positions such that the center of a through hole 201 on one side is set between through holes 201 on the other side. The ring-shaped wall portion 202 connects with part of the ring-shaped wall portion 202 corresponding to the next through hole 201 and thus, all the ring-shaped wall portions 202 are formed as one integrated entity. The areas between the upper side ring-shaped wall portions 202 and the side portion 204 located on the upper side and between the lower side wall portions 202 and the side portion 204 located on the lower side are recessed, and thus, the side plate 250 assumes a smaller thickness over these areas.

Either a positive terminal holder 205 that holds the outer edge of the positive terminal 140a of a battery cell 140 or a negative terminal holder 206 that holds the outer edge of the negative terminal 140b of a battery cell 140 is formed between each through hole 201 and the corresponding ring-shaped wall portion 202. The positive terminal holder 205 and the negative terminal holder 206 are arranged in alternating positions along the length of the case body 110. The positive terminal holders 205 and the negative terminal holders 206 are formed at the side plate 251 so that the polarity of the terminal holder, formed at a given through hole 201 corresponding to one of the through holes 201 at the side plate 250, is opposite the polarity of the terminal holder at the through hole 201 at the side plate 250.

The positive terminal holders 205 each include a circular projecting portion 205b formed further inward relative to the wall portion 202 and assuming a height significantly smaller than that of the wall portion 202. A groove 205a is formed between the projecting portion 205b and the wall portion 202. A positive terminal holding surface 205c is formed between the projecting portion 205b of the positive terminal holder 205 and the corresponding through hole 201. The bottom surface of the circular groove 205a assumes a position slightly higher than the bottom surface of the positive terminal holding surface 205c. The circular groove 205a is formed so as to achieve a width and an area smaller than the width and the area of the positive terminal holding surface 205c.

As indicated by the two-point chain line in FIG. 8, an adhesive 220 of room temperature curing type is applied onto the top surface of the projecting portion 205b, the surface inside the circular groove 205a and inside the positive terminal holding surface 205c. The adhesive 220 is uniformly applied over these surfaces so that when solidified, its upper surface forms a substantially flat plane. Due to this, the adhesive 220 fills the circular groove 205a completely and forms a thick layer covering the top surface of the projecting portion 205b and the circular groove 205a.

The positive terminal 140a of a battery cell 140 is bonded as indicated by the dotted line onto the top surface of the adhesive 220 formed as described above. As the positive terminal 140a is pressed down on the adhesive 220 applied to the positive terminal holding surface 205c, it becomes bonded to the side plate 250. In addition, a circumferential edge portion 140a1 of the positive terminal 140a at the battery cell 140, forming a step slightly lower than the position of the positive terminal 140a, is bonded to the side plate 250 via the adhesive 220 applied over the positive terminal holding surface 205c. The adhesive 220 formed within the positive terminal holding surface 205c reliably adheres to the entire area around the circumferential edge portion 140a1 of the positive terminal 140a and thus reliably separates the space further inward relative to the positive terminal holding surface 205c from the space further outside relative to the positive terminal holding surface 205c. This condition is sustained after the edge portion 140a1 is bonded to the side plate 250.

At the negative terminal holder 206, a circular groove 206a is formed further inward relative to the corresponding wall portion 202. A negative terminal holding surface 206b is formed between the circular groove 206a and the through hole 201. The circular groove 206a is formed so as to achieve a width and an area smaller than the width and the area of the negative terminal holding surface 206b.

As indicated by the two-point chain line in FIG. 8, an adhesive 221 of a room temperature curing type is applied within the groove 206a and the negative terminal holding surface 206b. The adhesive 221 is uniformly applied over these surfaces so that when solidified, its upper surface forms a substantially flat plane. Due to this, the adhesive 221 fills the circular groove 206a completely and forms a thick layer covering the top surface of the negative terminal holding surface 206b and the circular groove 206a.

The negative terminal 140b of a battery cell 140 is bonded as indicated by the dotted line onto the top surface of the adhesive 221 formed as described above. As the negative terminal 140b is pressed down on the adhesive 220 formed within the negative terminal holding surface 206b, it becomes bonded to the side plate 250. In addition, a circumferential edge portion of the negative terminal 140b at the battery cell 140 is bonded to the side plate 250 via the adhesive 220 filling the groove 206a. The adhesive 220 applied to fill the groove 206a reliably adheres to the entire area around the circumferential edge portion of the negative terminal 140b and thus reliably separates the space further inward relative to the groove 206a from the space further outside relative to the groove 206a. This condition is sustained after the circumferential edge portion 140a1 is bonded to the side plate 250.

As described above, the adhesive 220 filling the circular groove 205a of the positive terminal holder 205 reliably adheres to the entire area around the circumferential edge portion 140a1 of the positive terminal 140a and the adhesive 221 filling the circular groove 206a of the negative terminal holder 206 reliably adheres to the entire area around the circumferential edge portion of the negative terminal 140b. Furthermore, these conditions are sustained after the circumferential edge portions become bonded.

As a result, the cooling medium flowing through the case body 110 as it travels from the cooling medium intake port 114 toward the cooling medium outlet port 115 is blocked by the adhesive 220 filling the circular grooves 205a at the positive terminal holders 205 and the adhesive 221 filling the circular grooves 206a at the negative terminal holders 206 and therefore, never flows out toward the outer surface of the side plate 250.

If a battery cell 140 is damaged due to shock or vibration, or if the battery cell 140 is overcharged, the internal pressure at the battery cell 140 may rise to a level at which the cleavage valve cleaves, resulting in emission of the gas including liquid in mist form (a mixed gas containing liquid such as the electrolyte and a gas) from the internal space of the battery cell 140. Even in the event of such gas emission, the gas including liquid in mist form is blocked by the adhesive 220 filling the circular grooves 205a at the positive terminal holders 205 and by the adhesive 221 filling the circular grooves 206a at the negative terminal holders 206 and is thus never allowed to flow toward the space inside the side plate 250.

As shown in FIGS. 6 and 8, projections 207 are formed at another surface 250b of the side plate 250, located on the side opposite from one surface 250a of the side plate 250, so that each through hole 201 is partially surrounded by a projection 207. In addition, a plurality of fixing guides 130a, to be used when installing the conductive members 150 to be connected to the battery cells 140, are formed between the through holes 201 at the other surface 250b. The projections 207 and the fixing guides 130a, each projecting outward beyond the other surface 250b, are formed so as to prevent the conductive members 150 from contacting the covering plate 160. Through these measures, short-circuiting between the covering plate 160, which may be constituted with a metal flat plate such as an iron flat plate, and the conductive members 150 can be prevented.

At the side plate 250, a gas discharge passage 138 (see FIG. 6), through which the gas including liquid in mist form having been released into the gas release chamber located between the side plate 250 and the covering plate 160 is discharged to the outside of the electricity storage module 100, is formed. The opening of the gas discharge passage 138 is formed toward the bottom of the side plate 250 so as to ensure that the liquid contained in the gas, such as the electrolyte, is discharged smoothly. In more specific terms, the gas discharge passage 138 is formed at the side plate 250 at a position further toward the cooling medium intake port 114 and also on the side further toward the outlet flow passage forming portion 118. The front end of the gas discharge passage 138 is formed in the shape of a tube, to which the gas discharge pipe 139 (see FIG. 3), used to guide the gas discharged through the gas discharge passage 138 to the outside, is connected.

At the top surface of the side plate 250, i.e., its surface facing toward the intake flow passage forming portion 111, two connector terminals 810 are disposed side-by-side along the lengthwise direction. The connector terminals 810, formed as integrated parts of the side plate 250 by using the same molding material as that constituting the side plate 250, are positioned at the top surface of the side plate 250 at a position further toward the cooling medium intake port 114.

As described above, the positive terminal 140a and the negative terminal 140b of each battery cell 140, respectively housed at the positive terminal holder 205 and the negative terminal holder 206 at the side plates 250 and 251, are held by the ring-shaped wall portions 202. The battery cells 140, sustaining this condition, are then placed in the case body 110. This means that there is no need to provide members for holding the battery cells 140 inside the case body 110 and that the entire inner space of the case body 110 is utilized as a flowing space through which the cooling medium flows.

The conductive members 150 that connect the battery cells 140 in series are connected to the connector terminals 810 via voltage detection conductors (not shown) so as to enable detection of the voltages at the individual battery cells 140. A voltage detection conductor is embedded in the side plate 250 through integral molding.

Each connector terminal 810, which includes a current breaking unit (not shown), electrically connects, via the voltage detection conductor and the current cutoff portion, with a connecting line 800 (see FIGS. 2 and 3) extending from a voltage detection connector 912 (see FIGS. 2 and 3) at the controller 900.

The voltage detection connector 912 is installed at each of the two ends of the controller 900, facing opposite each other along the crosswise direction. The connecting lines 800 connected to the connector terminals 810 at the high potential-side electricity storage module 100a are connected to the connector 912 at the controller 900, disposed above the high potential-side electricity storage module 100a. The connecting lines 800 connected to the connector terminals 810 at the low potential-side electricity storage module 100b, on the other hand, are connected to the connector 912 at the controller 900, disposed above the low potential-side electricity storage module 100b. The length of a connecting line 800 is set to a value equivalent to the distance between the connector terminal 810, to which it is connected, and the corresponding connector 912, so as to prevent a wiring error. For instance, the connecting line 800 connected to a connector terminal 810 at the high potential-side electricity storage module 100a is not long enough to reach the connector 912 for the low potential-side electricity storage module 100b. The current breaking unit, which includes a fuse wire, fulfills a function of protecting the product by breaking off the currents from the individual battery cells 140 as it melts and break off the connecting line 800 in the event of a malfunction in the controller 900 or the connecting line 800.

The conductive members 150 shown in FIG. 6 are plate members constituted of a metal such as copper, via which the battery cells 140 are electrically connected. The conductive members 150 are members independent of the side plate 250.

The conductive members 150 are each made up with a central portion extending in a strip and bonding portions located on the two sides of the central portion.

A conductive member 150 is attached to the side plate 250 by fitting two through holes 155 formed in the central portion at two fixing guides 130a (see FIG. 8) formed at the side plate 250. When the conductive member 150 is fitted at the side plate 250, the bonding portions of the conductive member 150 are placed through the through holes 201 and come into contact with the positive and negative terminals 140a and 140b respectively of two battery cells 140. In this state, welding portions 154, each formed as a step at a bonding portion of the conductive member 150, are bonded to the positive terminal 140a and the negative terminal 140b through TIG (tungsten inert gas) welding or the like.

The conductive members 150 are each made up with a central portion extending in a strip and bonding portions located on the two sides of the central portion.

The conductive member 150 includes two welding portions 154 at each bonding portion, i.e., a total of four welding portions 154. Thus, each bonding portion is welded to the positive terminal 140a or the negative terminal 140b of a battery cell 140 at two welding points.

In addition, an end portion 800a of the voltage detection conductor (not shown) embedded in the side plate 250 is exposed through the through holes 201 at the side plate 250, and the end portion 800a of the voltage detection conductor is welded to side end portions 157 of the conductive members 150. The end portion 800a, too, can be welded through TIG welding or the like.

The controller 900 is disposed above the electricity storage module unit 100. More specifically, the controller 900 is an electronic circuit device disposed astride the high potential-side electricity storage module 100a and the low potential-side electricity storage module 100b. It includes a casing 910 and a circuit substrate housed inside the casing 910.

The casing 910, which is a flat rectangular parallelepiped box constituted of metal, is fixed to the high potential-side electricity storage module 100a and the low potential-side electricity storage module 100b via fixing means such as bolts or screws. One of the two ends of the high potential-side electricity storage module 100a facing opposite each other along the crosswise direction is thus connected to and fixed to one of the two ends of the low potential-side electricity storage module 100b facing opposite each other along the crosswise direction. In other words, since the controller 900 also functions as a holding member, even better strength is assured for the electricity storage module unit 100.

A plurality of connectors are disposed at the side surfaces of the casing 910, i.e., at two end surfaces of the controller 900 facing opposite each other along the crosswise direction. The plurality of connectors includes the voltage detection connectors 912, a temperature detection connector 913 and an external connection connector 911. The connectors of the connecting lines 800 electrically connected to the 32 battery cells 140 are coupled with the voltage detection connectors 912. Connectors of signal lines 941 from a plurality of temperature sensors (not shown) disposed inside the electricity module unit 100 are connected to the temperature detection connector 913.

Connectors (not shown) of a power line through which drive power is supplied to the battery controller 300, a signal line through which an ignition key switch on/off signal is input, a communication line enabling CAN communication with the vehicle controller 30 or the motor controller 23 and the like are connected to the external connection connector 911.

The electricity storage device 1000 is configured as described above.

Next, the cooling system through which the battery cells 140 housed inside the battery case 2 is cooled will be described.

Figure 9:
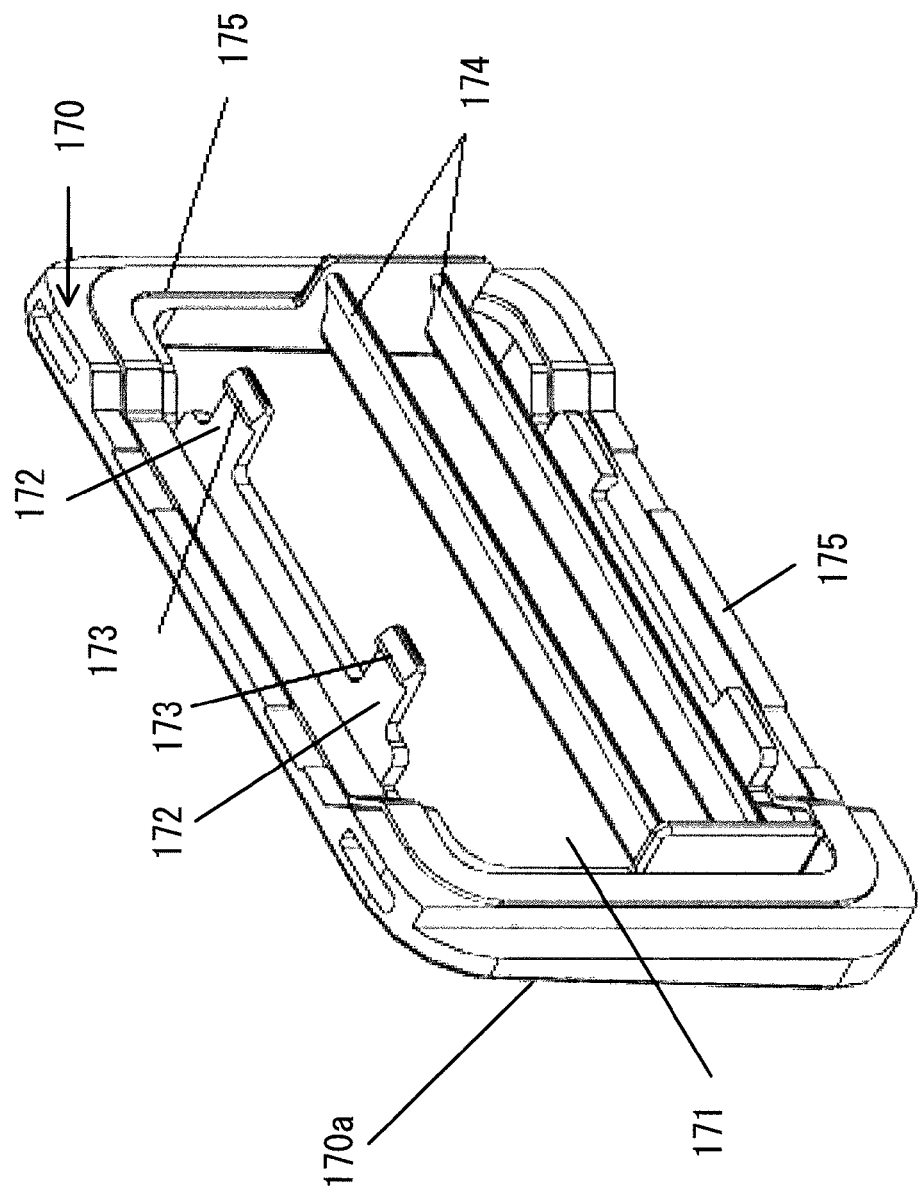
FIG. 9 is a perspective view of the cooling medium intake-side duct achieved in an embodiment of the present invention.

FIG. 9 shows a cooling medium intake-side duct achieved in an embodiment of the present invention in a perspective view. In this perspective view, the cooling medium intake duct 170 is viewed from the rear side, i.e., from the side on which the cooling medium intake duct 170 is mounted at the battery case 2.

The cooling medium intake duct 170 includes an opening 171, slightly smaller than the cooling medium intake port 114, which is formed at a position corresponding to the position of the cooling medium intake port 114 (see FIG. 5). Two retainer pieces (engaging members) 172 are formed at the edge of the opening 171 on the upper side. Each retainer piece 172 is formed so as to project out substantially perpendicular to an outer surface 170a of the cooling medium intake duct 170, with a hook-shaped engaging portion 173 formed at an end thereof.

The retainer piece 172 is elastic and is thus allowed to deform along a direction perpendicular to the projecting direction. As the retainer piece 172 is deformed, the engaging portion 173 becomes displaced along the up/down direction.

In addition, blades (guide members) 174, which are tilted at a predetermined angle relative to the outer surface 170a of the cooling medium intake duct 170 are formed, one at a central portion and another toward the bottom of the opening 171 along the height of the opening 171 at the cooling medium intake duct 170. The blades 174 has a function of guiding the cooling medium flowing into the case body 110, and by adjusting the tilting angle of the blades 174, the flow rate of the cooling medium or the cooling medium inflow direction can be controlled.

A sealing member 175 is attached via an adhesive or the like to the inner surface around the edge of the opening 171 at the cooling medium intake duct 170. The sealing member 175 assures a high level of airtightness between the cooling medium intake duct 170 and the case body 110.

Figure 10:
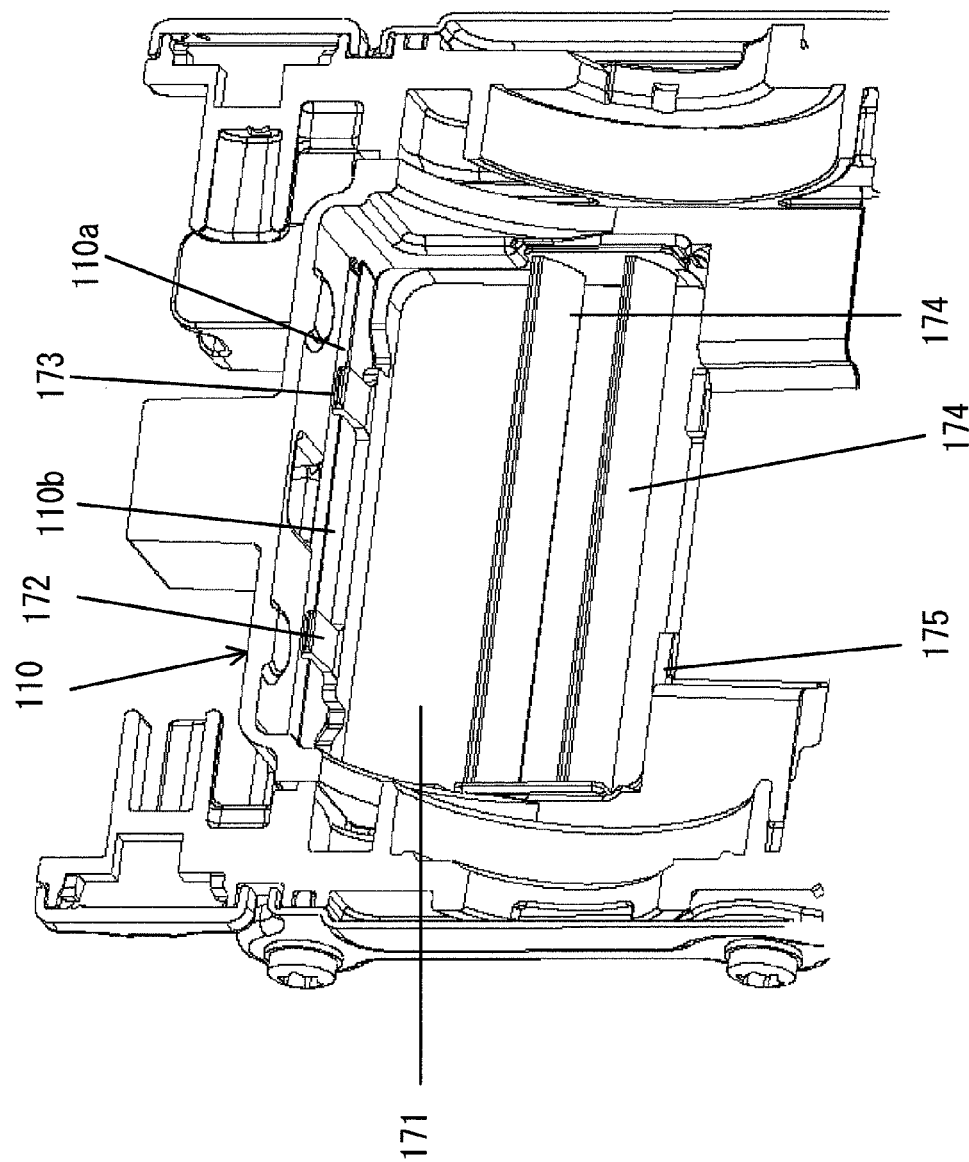
FIG. 10 is a sectional view taken through line X-X in FIG. 5.

FIG. 10 is a sectional view taken through line X-X in FIG. 5. Namely, it shows the cooling medium intake duct 170 attached to the case body 110 in a perspective view taken from the inside of the case body 110.

A stepped portion 110a (engagement contact portion), which is to correspond to the engaging portions 173 of the retainer pieces 172 at the cooling medium intake duct 170, is formed at the inner surface of the case body 110 on the side where the cooling medium intake port 114 is present.

The cooling medium intake duct 170 is attached to the case body 110 by shifting the cooling medium intake duct 170 along the x direction in FIG. 5, i.e., along the direction in which the retainer pieces 172 project out.

With the upper ends of the engaging portions 173 coming into contact with an inner wall 110b of the case body, the retainer pieces 172 at the cooling medium intake duct 170 bent downward and thus, as the cooling medium intake duct 170 shifts along the x direction, the retainer pieces 172 move forward further toward the case body 110. As the engaging portions 173 reach the stepped portion 110a of the case body 110, the retainer pieces 172 at the cooling medium intake duct 170 regain their initial shape due to resilience force and thus, the engaging portions 173 become retained at the staged portion 110a of the case body 110.

In this state, the sealing member 175 achieves tight contact with the surface of the case body 110 surrounding the cooling medium intake port 114 and thus, the space inside the case body 110 is tightly sealed.

The retainer pieces 172, having the property of elasticity, prevent the engaging portions 173 from becoming readily released from the staged portion 110a.

The flow rate and the inflow direction of the cooling medium flowing into the case body 110 can be adjusted with the tilting angle of the blades 174 at the cooling medium intake duct 170. In other words, the flow rate and the inflow direction of the cooling medium flowing into the case body 110 can be altered simply by manufacturing a cooling medium intake duct 170 with the blades 174 thereof assuming a specific angle and mounting the cooling medium intake duct 170 at the case body 110. Since this eliminates the need to change the overall structure of the case body 110 for purposes of flow rate/inflow direction adjustment and the case body 110 can be standardized, better productivity is assured.

Furthermore, the cooling medium intake duct 170, which can be formed by using a synthetic resin such as PBT (polybutylene terephthalate) or PP (polypropylene), is bound to be less costly than a cooling medium intake duct manufactured through an expensive aluminum die casting process.

The cooling medium intake duct 170, having suffered damage and thus needing to be replaced, can be disengaged through the procedure described below.

First, the cooling medium intake duct 170 is shifted downward, i.e., along the y direction in FIG. 5. Through this shift, the engaging portions 173 of the cooling medium intake duct 170 become disengaged from the stepped portion 110a of the case body 110.

Next, the cooling medium intake duct 170 is rotated pivoting at the upper side edge. In other words, the lower side of the cooling medium intake duct 170 is pulled along the r direction in FIG. 5. This causes the engaging portions 173 of the cooling medium intake duct 170 to move away from the staged portion 110a of the case body 110. Thus, by moving the entire cooling medium intake duct 170 along a direction opposite from the x direction, the cooling medium intake duct 170 can be disengaged.

Since the entire case body 110 does not need to be replaced when the cooling medium intake duct 170 is damaged, the maintenance costs can be reduced.

The detachable duct 170 of the electricity storage module achieved in the embodiment as described above can be engaged to the case body 110 by fitting it into the case body 110. As a result, because the tilting angle of the blades can be changed, an appropriate duct can be employed, according to the thermal environment of installation location for the electricity storage module. Therefore, since structural elements other than the duct 170 do not need to be altered, a reduction in production cost can be achieved.

In addition, similar to the case that the present invention is applied to the electricity storage modules that may be operated in varying thermal environments, advantages can also be achieved by applying the present invention in electricity storage modules configured with identical case bodies 110 with varying numbers of battery cells housed therein.

It is to be noted that in the embodiment described above, it is explained about an example embodiment in which the tilting angle of the blades are changed. However, the flow rate/inflow direction may instead be adjusted by selectively using an optimal duct among various ducts with varying duct opening areas. As a further alternative, the opening area and the tilting angle of blade may both be adjusted.

In addition to the advantages described above, the following advantages are achieved with the electricity storage module unit 100 in the embodiment described above.

(1) The electricity storage module unit 100 includes a plurality of battery cells 140, a case body 110 where the battery cells 140 are housed, a plurality of conductive members 150 used to electrically connect the battery cells 140, and voltage detection conductors via which the voltages at the battery cells 140 are individually detected. The case body includes, at least, a pair of resin side plates 250 and 251 that support the battery cells 140 by holding them on two sides. The voltage detection conductors are each an integrated part of the side plate 250 or the side plate 251. This structure eliminates the need for ample space where voltage detection lead lines can be manually installed at the side plates 250 and 251 and a complicated manufacturing process for voltage detection lead line installation, making it possible to produce the electricity storage module unit 100 more efficiently. In particular, the voltage detection conductors can be installed with great ease at an electricity storage module unit 100 provided as a more compact unit.

(2) The conductive members 150, to be used to connect the battery cells 140, are mounted at the side plates 250 and 251 from the outside of the case body 110. Thus, the conductive members 150 can be connected to the individual battery cells 140 with ease.

(3) The end portion 800a of a voltage detection conductors is connected to the conductive members 150, and a current breaking unit, which breaks off the electrical currents from the battery cells 140, is formed at the other end of the voltage detection conductor. The current breaking unit breaks off currents from the battery cells in the event of a malfunction of the controller 900 or the wiring by fusing the fuse wire so as to protect the product. In the event of a short-circuit occurring at a connecting line 800, for instance, the currents will be broken off at the current breaking unit located at the other end of the voltage detection conductor. As a result, the entire electricity storage module unit 100 can be protected. Under such circumstances, the electricity storage module unit 100 can be reused by replacing the wiring and the current breaking unit. It is to be noted that short circuiting does not essentially occur at the voltage detection conductor itself, which is first molded into a predetermined shape and then integrated with the side plate 250 or 251.

(4) Through holes 201 are formed at the side plates 250 and 251 at positions corresponding to the positions of the battery cells 140, with circular grooves 205a and 206a formed at the side plates 250 and 251 so as to allow the adhesives 220 and 221, used to bond the battery cells 140, to form layers achieving a sufficient thickness. The battery cells 140 are fixed with the adhesives 220 and 221 to the side plates 250 and 251 by tightly filling the through holes 201. As a result, the space inside the case body 110 and the space outside the case body 110 can be separated from each other with a higher level of reliability so as to assure better product reliability. Furthermore, a solid connection between the battery cells 140 and the side plates 250 and 251 can be sustained by absorbing any external force applied to the electricity storage module 100, such as vibration, via the adhesives.

(5) Metal covering plates 160 are disposed at the case body 110 so as to cover the exteriors of the pair of side plates 250 and 251. The side plates 250 and 251 each include fixing guides 130a and projections 207 which function also to prevent collision so that the corresponding covering plate 160 and the conductive members 150 do not come into contact. For instance, an external force applied to the covering plate 160 may cause the covering plate 160 to become deformed and deformed toward the inside of the case body 110. Under such circumstances, the covering plate 160 will first contact a fixing guide 130a or a projection 207 projecting out beyond the surface of the side plate 250 or 251. Thus, any short circuiting attributable to contact between the covering plate 160, which may be constituted of, for instance, iron, and a conductive member 150, can be prevented. Furthermore, since the projections 207 practically surround the entire area around the conductive members 150 except for the areas near the front end 800a, various types of external forces can be withstood via the projections 207.

(6) The electricity storage device 1000 includes the electricity storage module unit 100 and the controller 900 that detects the voltages at the battery cells 140 connected to the voltage detection conductors and controls the amount of power stored in the battery cells 140. Since the electricity storage module unit 100 can be manufactured without having to install the voltage detection lines through a complicated wiring process, as described earlier, the electricity storage device 1000 as a whole can be manufactured with a high level of efficiency.

The cooling medium intake duct 170 achieved in the embodiment described earlier is attached to the case body 110 by engaging the retainer pieces 172 with the staged portion 110a formed at the case body 110. As an alternative, the cooling medium intake duct 170 may be fixed to the case body 110 via a fixing member.

The battery case 2 in the embodiment described above is constituted with a case body 110, a pair of side plates 250 and 251 disposed over the two side surfaces of the case body 110, and covering plates 160 disposed further outside relative to the respective side plates. However, the present invention may be adopted in conjunction with a battery case 2 constituted with components other than those. For instance, either the side plate 250 or the side plate 251 may be formed as an integrated part of the case body through integrated molding. As an alternative, the battery case 2 may assume a top/bottom split structure constituted with a bottom case that includes a battery housing portion and a top case that covers the battery housing portion. In short, the present invention allows for various modifications.

In the embodiment described above, the cooling medium intake duct 170 is attached to the front side of the case body 110 so as to take in the cooling medium through a straight path along the direction in which the battery cells 140 housed inside the case body 110 are set one after another. As an alternative, the cooling medium intake duct 170 may be attached to a side surface of the case body 110 so as to take in the cooling medium along a direction perpendicular to the array direction of the battery cells 140 housed inside the case body 110. Such a structure will require an airflow guiding means for adjusting the flow of the cooling medium taken into the case body 110 to match the array direction of the battery cells 140.

This principle also applies to the cooling medium outlet duct 117. Namely, the cooling medium outlet duct 117 may be disposed at a side surface of the case body 110.

The electricity storage module unit 100 achieved in the embodiment described above is constituted with the electricity storage module 100a and the electricity storage module 100b each equipped with sixteen battery cells 140 connected therein. However, the present invention is not limited to the particulars pertaining to the structure of the electricity storage module unit 100 described above or the specific connections (serial connection/parallel connection) in the electricity storage module unit 100 described above. In other words, the present invention may be adopted in an electricity storage module with different numbers of battery cells 140 and battery cell rows, arrayed with a different array pattern along a different arraying direction.

Furthermore, while the battery cells 140 in the embodiment described above are lithium ion battery cells, the present invention may be adopted in conjunction with batteries other than lithium-ion batteries, such as nickel-metal hydride batteries.

The electricity storage device 1000 achieved in the embodiment as described above may be used as a vehicular power source device for other types of electrically driven vehicles, including a railway vehicle such as a hybrid train, a public transportation vehicle such as a bus, a freight vehicle such as a truck and an industrial vehicle such as a battery-operated forklift truck.

Moreover, the electricity storage device 1000 achieved in the embodiment may be adopted as part of power source systems used in applications other than electrically driven vehicles, including failsafe power supply systems for computer systems or server systems and power source systems used for on-site industrial power generation.

The electricity storage module unit 100 according to the present invention allows further modifications without departing from the technical scope of the present invention. Namely, any electricity storage module comprising a battery case that includes a cooling medium intake port, a cooling medium outlet port and a cooling flow passage through which a plurality of battery cells housed therein in a parallel array pattern are cooled, and a duct detachably mounted at the cooling medium intake port of the battery case will be considered to fall within the scope of the present invention.

Through the embodiment described above, in which the cooling medium intake-side duct, prepared as a separate member is mounted at the battery case, better productivity is achieved since it allows the battery case to be manufactured as a universal component.

The above described embodiments are examples and various modifications can be made without departing from the scope of the invention.

What is claimed is:

1. An electricity storage module, comprising:
 a battery case in which a plurality of battery cells are housed, and which forms a cooling flow passage through which a cooling medium that cools the plurality of battery cells flows, the battery case including:
 a case body in which the plurality of battery cells are housed such that axes of the plurality of battery cells are arranged in a parallel array pattern, and a cooling medium intake port through which the cooling medium is introduced into the cooling flow passage is formed on one side as viewed in an array direction of the plurality of battery cells, while a cooling medium outlet port through which the cooling medium is delivered from the cooling flow passage is formed on another side as viewed in the array direction of the plurality of battery cells, the case body being open at sides thereof facing positive terminals and negative terminals of the plurality of battery cells; and a pair of side plates that block off openings of the case body, and hold the plurality of battery cells while sandwiching the battery cells from a positive-terminal side and a negative-terminal side thereof; and a duct that is fitted in the cooling medium intake port, and controls flow of the cooling medium that flows into the cooling flow passage through the cooling medium intake port, wherein:

an engagement contact portion that engages with the duct is formed inside the cooling medium intake port of the case body;

the duct is provided as a separate component from the case body, and is located outside the coolant medium intake port of the case body, the duct being detachably mounted from an outside of the cooling medium intake port;

the duct includes:

an opening corresponding to the coolant medium intake port;

a plurality of blades formed to be inclined by a predetermined inclination angle, and provided in the opening for guiding flow of the cooling medium; and an engaging portion that protrudes from an upper edge portion of the opening toward the cooling medium intake port, and engages with the engagement contact portion; and the duct is arranged to pivot about the upper edge portion of the opening when a lower portion of the opening is pulled in a direction away from the coolant medium intake port, so that the engaging portion is allowed to be disengaged from the engagement contact portion.

2. An electricity storage module according to claim 1, wherein
the case body is formed of a metal material, and the side plates and the duct are formed of a resin material.

3. An electricity storage module according to claim 1, wherein
the duct includes a seal that provides close contact between a circumferential edge of the opening and the case body.

* * * * *